(12) United States Patent
Hintz

(10) Patent No.: US 10,132,920 B2
(45) Date of Patent: Nov. 20, 2018

(54) DISPERSIVE OBJECT DETECTOR AND CLUTTER REDUCTION DEVICE

(71) Applicant: Kenneth J Hintz, Fairfax Station, VA (US)

(72) Inventor: Kenneth J Hintz, Fairfax Station, VA (US)

( * ) Notice: Subject to any disclaimer, the term of this patent is extended or adjusted under 35 U.S.C. 154(b) by 433 days.

(21) Appl. No.: 15/017,638

(22) Filed: Feb. 7, 2016

(65) Prior Publication Data

US 2016/0238696 A1   Aug. 18, 2016

Related U.S. Application Data

(60) Provisional application No. 62/116,865, filed on Feb. 16, 2015.

(51) Int. Cl.
| G01S 7/41 | (2006.01) |
| G01S 7/292 | (2006.01) |
| G01S 7/42 | (2006.01) |
| G01S 13/00 | (2006.01) |
| G01S 13/88 | (2006.01) |
| G01S 13/02 | (2006.01) |
| G01S 13/48 | (2006.01) |

(52) U.S. Cl.
CPC .............. *G01S 7/414* (2013.01); *G01S 7/2923* (2013.01); *G01S 7/2926* (2013.01); *G01S 7/42* (2013.01); *G01S 13/003* (2013.01); *G01S 13/88* (2013.01); *G01S 13/0209* (2013.01); *G01S 13/48* (2013.01); *G01S 2013/0281* (2013.01)

(58) Field of Classification Search
CPC . G01S 7/414; G01S 13/88; G01S 7/42; G01S 7/2926; G01S 7/2923; G01S 13/003; G01S 2013/0281; G01S 13/48; G01S 13/0209
USPC ........................................................ 342/159
See application file for complete search history.

(56) References Cited

U.S. PATENT DOCUMENTS

| 7,382,312 | B2 | 6/2008 | Hintz | |
| 8,599,061 | B2 | 12/2013 | Hintz | |
| 8,912,951 | B2 * | 12/2014 | Campbell | G01S 13/526 |
| | | | | 342/159 |
| 8,939,367 | B2 | 1/2015 | Hintz | |
| 2013/0194130 | A1 | 8/2013 | Abatzoglou et al. | |
| 2014/0097980 | A1 | 4/2014 | Cambell et al. | |
| 2016/0327422 | A1 * | 11/2016 | Gluth | G01S 7/282 |
| 2017/0131397 | A1 * | 5/2017 | Schoor | G01S 13/584 |

* cited by examiner

*Primary Examiner* — Frank J McGue

(57) ABSTRACT

An apparatus for detecting a dispersive object in non-dispersive clutter comprising a multi-frequency radar, a signal processor which computes the elapsed time between when each frequency is transmitted and that same frequency is received and the dispersion statistics related to the several frequencies. A dispersion analyzer produces a dispersive object discrimination value which is compared with a threshold by which a detection is declared. The apparatus also utilizes dispersion statistics to differentiate between dispersive and non-dispersive radar returns in order to reject the non-dispersive signals and pass the dispersive signals to a signal integrator which increases the signal-to-clutter ratio thereby improving the probability of detection of subsequent target detection processes.

20 Claims, 8 Drawing Sheets

DISPERSIVE OBJECT DETECTOR AND CLUTTER REDUCTION DEVICE

CROSS-REFERENCE TO RELATED APPLICATIONS

This application claims the benefit of U.S. Provisional Application No. 62/116,865, filed Feb. 15, 2015, which is hereby incorporated by reference in its entirety.

STATEMENT REGARDING FEDERALLY SPONSORED RESEARCH OR DEVELOPMENT

This invention was not made with government support.

BACKGROUND

There is a need for effective pre-engagement detection of snipers because a single shot casualty of a high-value target is often sufficient to achieve the sniper's objective and there is often no intent to fire a second round. Pre-engagement detection of sniper weapons by detecting dispersion in radar signals after they interact with the rifle provides a proactive ability to eliminate or significantly reduce the threat of snipers by notifying the potential victim of presence of a sniper's weapon before the sniper shoots. What is needed is a technology capable of detecting snipers before they fire. Two methods are disclosed in this specification. A first apparatus and method is disclosed which differentiates between dispersive and non-dispersive radar signals to differentiate between cavities which are dispersive and clutter which is non-dispersive. A second apparatus and method is disclosed which processes a sequence of radar signals containing both dispersive and non-dispersive frequency components in such a way as to improve the signal-to-clutter ratio (SCR). This SCR enhanced signal can then be sent on to other processing apparatus for final detection.

BRIEF DESCRIPTION OF THE SEVERAL VIEWS OF THE DRAWINGS

Example

DETAILED DESCRIPTION OF EMBODIMENTS

Figure 1:
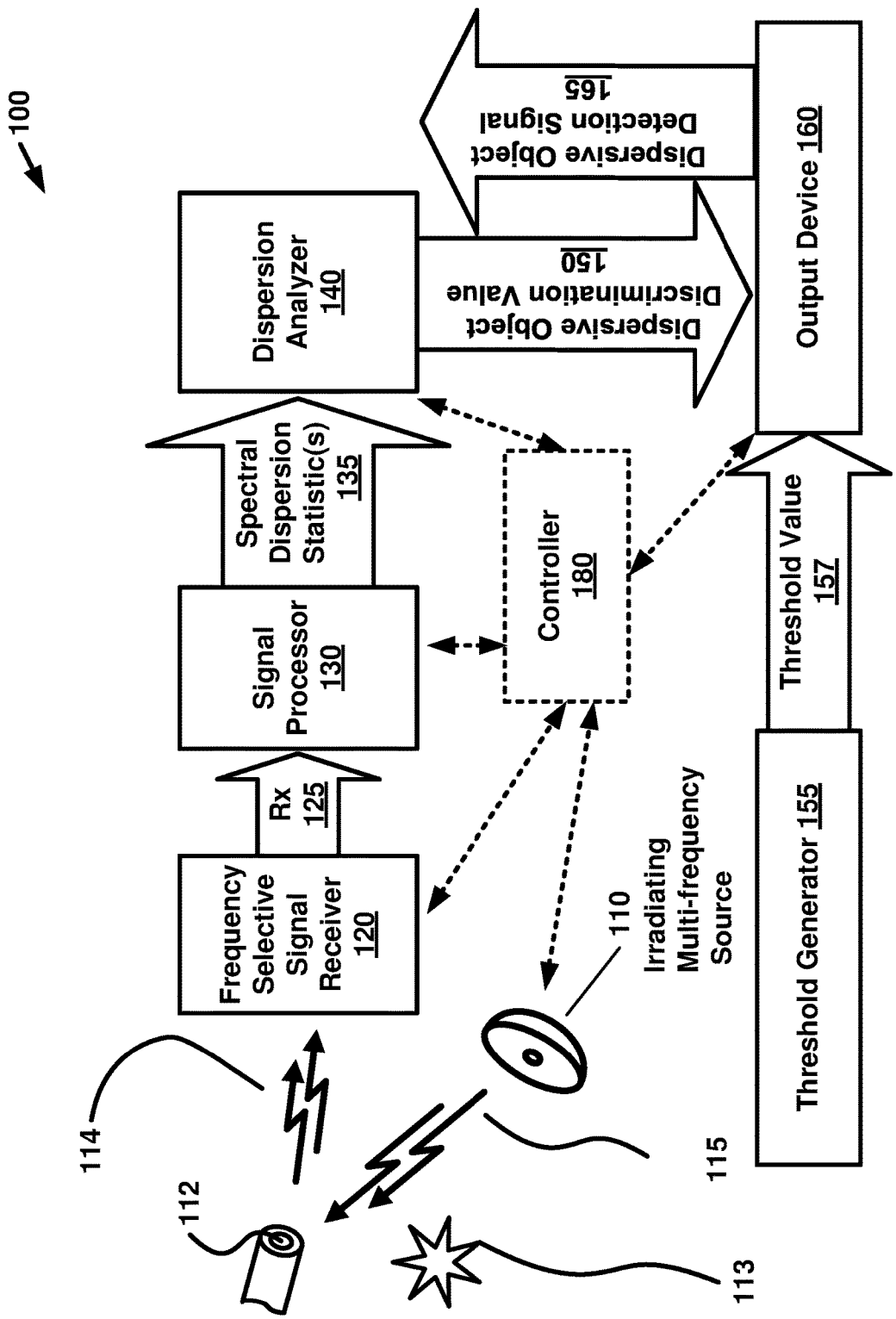
FIG. 1 is a block diagram of an example dispersive object or dispersive target detection device as per an aspect of an embodiment of the present invention.

Embodiments of the present invention measure the difference in apparent range or phase to an object when different radio frequencies (RF) are used in a radar. Radio frequencies in this specification is meant to refer to any frequency of electromagnetic wave. Some embodiments may be configured to differentiate between objects which are dispersive and those which are non-dispersive when illuminated over a range of RF. Additional embodiments may be used to improve the signal-to-clutter ratio (SCR) between dispersive and non-dispersive objects. Embodiments may be configured to differentiate between numerous other objects with cavities including many non-military items such as exhaust pipes, jet engines, cavity defects in surfaces, etc. and non-dispersive objects of non-interest being illuminated by the same radar beam, these objects of non-interest being referred to as clutter.

Since many sniper weapons contain cavities, embodiments of the present invention may be utilized to detect the presence of a sniper, other weapons, or targets of interest containing cavities. Other embodiments may be used to increase the signal-to-clutter ratio before using other cavity and object detection methods such as those disclosed in U.S. Pat. Nos. 7,382,312, 8,599,061 and 8,939,367. The underlying principles behind the operation of this invention are several. The first is the fact that cavities behave as waveguides when illuminated with a radio frequency of short enough wavelength to enter into the cavity. Those frequencies which are above the circular waveguide cutoff frequency (CWCF) will enter into the open end of a cavity over a large angular extent relative to the central axis of the cavity. This phenomenon is not limited to circular waveguides, but applies to all waveguides which may exhibit different waveguide cutoff frequencies (WCF). The WCF can be readily calculated and is well known in electromagnetic wave and radar theory and practice. The second fact is that when radio frequencies which are above and near in frequency to the WCF propagate in a waveguide there is a phase delay which differs with frequency. This phenomena is referred to as dispersion and is shown with a stepped frequency radar in FIG. 7A and FIG. 7B. There are other types of dispersion which are not considered here such as atmospheric dispersion in which the variation of refractive index with frequency produces frequency dispersion of signals passing through the propagating medium such as the ionosphere. There are other causes of dispersion and methods of compensating for these are known, however target cavity induced dispersion may remain even after correcting for other dispersions and be utilized as a criterion for the detection of targets of interest which have dispersive characteristics.

Clutter is a term used to refer to unwanted echoes in electronic systems, particularly with reference to radars. Such echoes are typically returned from trees, plants, walls, ground, sea, rain, animals/insects, chaff and atmospheric turbulences, and can cause serious performance issues with radar systems. That is, they are real signals produced by real objects which interfere with the detection of targets of interest. The reduction of clutter signals in order to increase the SCR is not amenable to the techniques normally applied to the increase of signal-to-noise ratio (SNR).

The term scatterer may be used to describe individual locations on objects which reradiate electromagnetic energy.

It is well known that some clutter is dispersive, particularly when a radar is on a moving platform and radar targets are also moving such as disclosed in US Patent Application 20140097980 of Apr. 10, 2014. The referenced application discloses that "A dispersive scatterer may be considered as a clutter or interference and a non-dispersive scatterer is considered as the target and the dispersive scatterers may be deleted from the radar return signal to obtain a cleansed radar return signal." That is, while the referenced Application discloses a method for discriminating between targets and clutter, their method is predicated on the fact that clutter is dispersive and targets are not dispersive. In this present application, the converse is true in that the apparatus and method disclosed in the embodiments discriminate dispersive objects and objects from non-dispersive clutter. That is, the referenced Application would not detect cavities as disclosed herein because the cavities are dispersive when the radar is operating near and above the WCF and their detection criteria assumes that clutter is dispersive and targets are not.

An example embodiment of a target detection apparatus is shown in FIG. 1 and is based on the fact that the returns from non-dispersive objects increase in amplitude as the response of each frequency is added whereas the returns from dispersive objects increases by a much smaller amount and is spatially distributed over a longer apparent range. Apparent range is distinguished from actual range in that the measurement of range may depend on the time of flight, elapsed time, or transit time of the electromagnetic wave propagating in the propagation medium such as air from the transmitting antenna to the target and back to the receiving antenna. Due to the different phase delay introduced in each frequency by the dispersive characteristics of the object being measured, the returned signals do not sum to as large an amplitude as the non-dispersive signals do. Statistics related to the difference between the amplitude buildup across frequencies at each range can be used to differentiate dispersive from non-dispersive returns. When the amplitude of dispersive returns exceeds a threshold, then the detection of a dispersive object can be produced as a dispersive object detection signal.

Embodiments may also be used to increase SCR by processing a temporal sequence of radar returns and then pass the clutter reduced signal to other cavity and target detection methods and apparatus. The net result of this process is the increased probability of detection of the target of interest even though it is in the presence of non-dispersive clutter.

Figure 2:
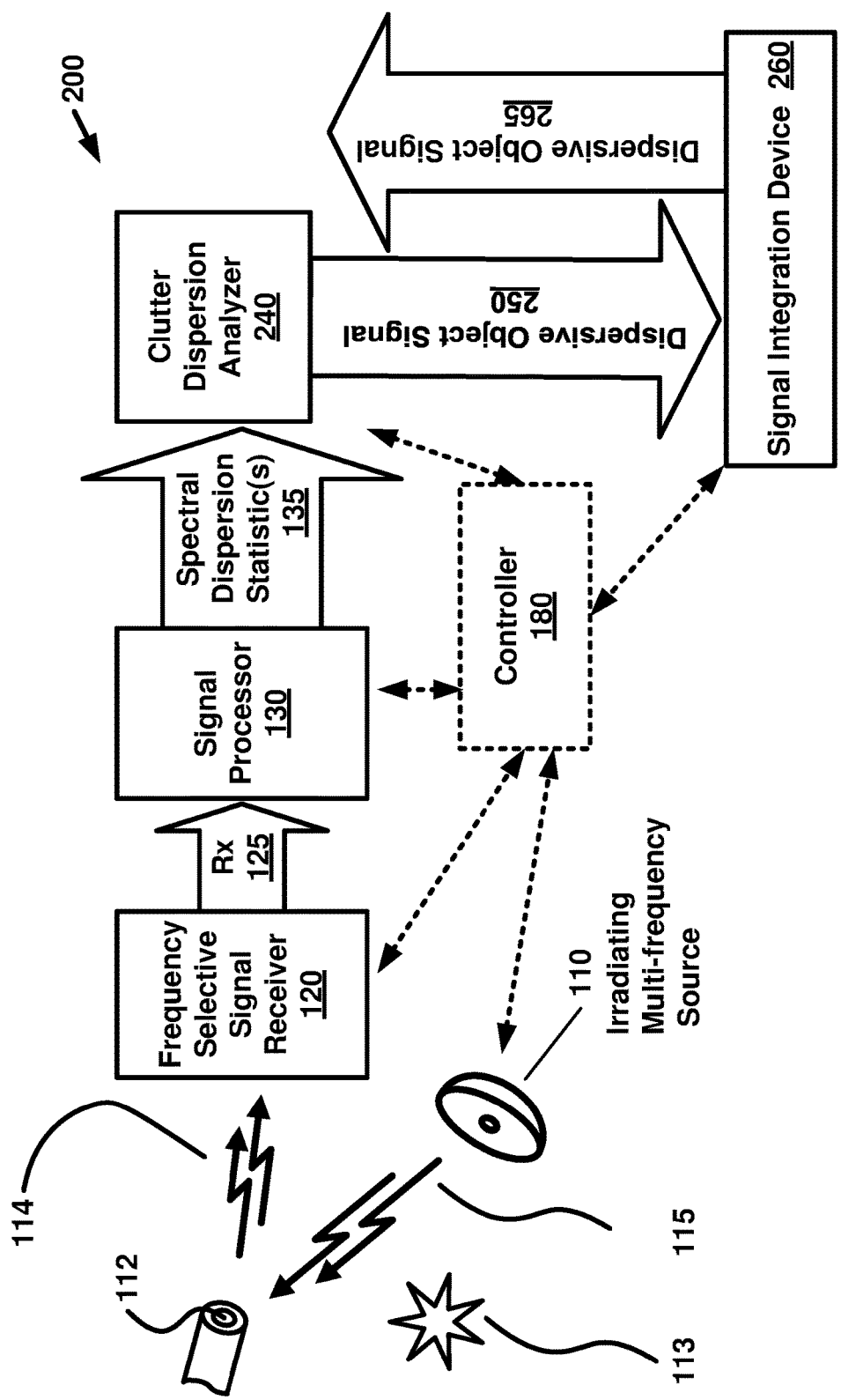
FIG. 2 is a block diagram of an example signal-to-clutter ratio enhancement device that uses a dispersive signal analyzer as per an aspect of an embodiment of the present invention.

An example of a clutter reduction embodiment is shown in FIG. 2 in which the signal processor measures the clutter and target dispersion characteristics and then passes the dispersive object signals to a signal integration device which improves signal-to-clutter ratio by coherently summing a multiplicity of radar returns as well as correcting for the phase dispersion caused by the object by any of a variety of known methods such as conversion to a time domain signal utilizing a Fourier transform and then passing the time domain (equivalently the range domain) signal through a matched filter. Alternatively, each frequency component could be phase corrected for the expected dispersion before Fourier transforming the signal into the time domain.

Unlike simpler reflecting surfaces, different electromagnetic wavelengths interacting with a cavity may reradiate signals whose amplitudes are modified by the presence of the cavity along a single angle from the cavity. The amplitude may be measured by a received signal's power. This interaction phenomenon may cause the electromagnetic wave to be reradiated differentially in amplitude at different frequencies. "Reradiated" as used here may be used interchangeably with the term "reflected" depending on the manner in which the reader understands the interaction of electromagnetic waves with materials. Alternatively, the interaction phenomenon may cause reradiated signals at a single frequency to be reradiated differentially in amplitude at different angles from the cavity. This differential radiation at different frequencies may express itself at a single angle of illumination and reradiation or as a spatially amplitude modulated pattern, the radar cross section, at a single frequency. The two phenomena being the Fourier transform of one another.

Figure 7A:
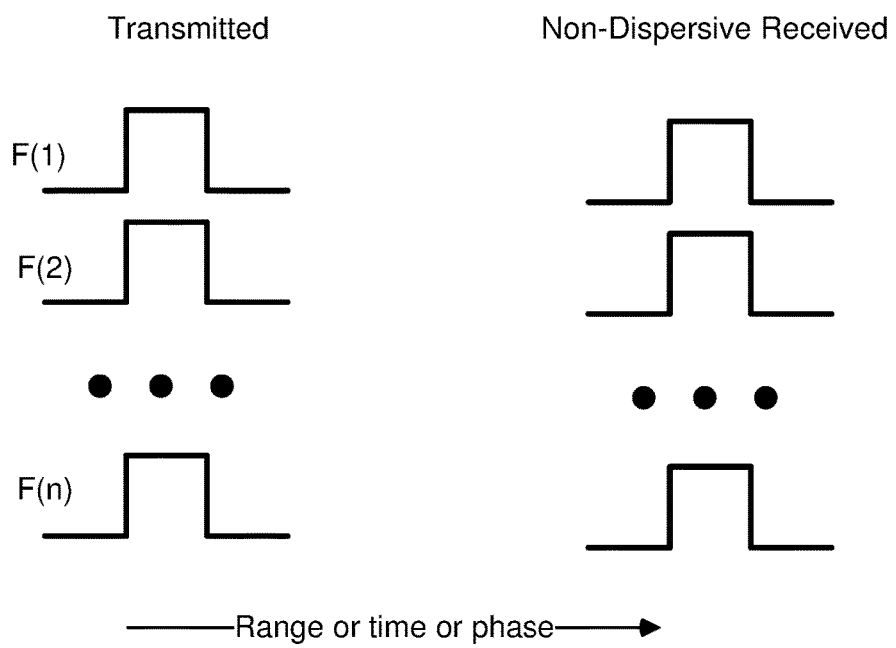
FIG. 7A shows a transmitted pulse at each of n different frequencies and the time delay between transmission and reception for a non-dispersive object showing that the transit or elapsed time or range or phase is constant from frequency to frequency.
Figure 7B:
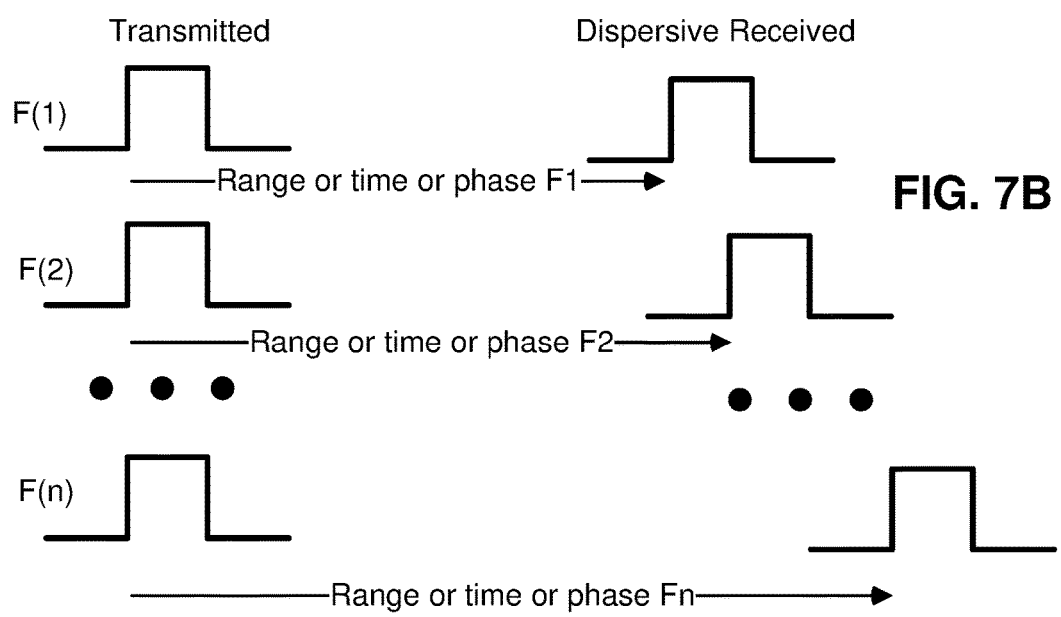
FIG. 7B shows a transmitted pulse at each of n different frequencies and the time delay between transmission and reception for a dispersive object showing that the transit or elapsed time or range or phase changes with frequency. This change can be deterministic or stochastic depending on the characteristics of the dispersive object.

The primary principle being exploited by this technology to measure the dispersive or non-dispersive nature of the radar return is that the transit time from the radar antenna to the object and back differs with radar electromagnetic frequency. This difference in transit time may express itself as different phase shifts for different frequencies. This difference in time may also express itself as different apparent ranges from the radar to the object. This transit time or range dependence on frequency is shown in FIG. 7A for a non-dispersive object and in FIG. 7B for a dispersive object. For ease of explanation, the signal is assumed to be a sequence of pulse amplitude modulated carrier frequencies (pulses of RF) which linearly increase in carrier frequency over time. It is well known in the art that different waveforms are capable of producing the same result. Both FIG. 7A and FIG. 7B show plots of transit time or range on the horizontal axis and amplitude envelope of the pulsed return for a sequence of different RF frequencies down the vertical axis. In FIG. 7A it can be readily seen that a non-dispersive scatterer (or group of scatterers) produces the same transit time or equivalently range of the object from the radar independent of the RF frequency. FIG. 7B shows the effect of a dispersive object (or group of scatterers) on the transit time or range of the object from the radar. In this dispersive case, the measured range or apparent range changes as the frequency of the carrier changes. When the results of the illumination by the several frequencies are combined for a non-dispersive object, the radar returns sum at a single range. When the results of the illumination by the several frequencies are combined for a dispersive object, the radar returns are distributed over several range bins making the single radar target which should appear at a single range bin look "smeared" or dispersed in range over several range bins.

One skilled in the art can easily develop an analytical expression for this dispersion, however the same relationship can be empirically derived from a series of measurements and is dependent on the dispersive object. The resulting empirical data can be used to create a look-up-table (LUT) which can be referred to in order to differentiate between dispersive objects and non-dispersive clutter.

Example FIG. 1 is a block diagram of an apparatus 100 configured to detect a dispersive object 112 in the presence of non-dispersive clutter 113. Embodiment 100 includes a frequency selective signal receiver 120, a signal processor 130, spectral dispersion statistic(s) 135, dispersion analyzer 140, dispersive object discrimination value 150, output device 160, and a dispersive object detection signal 165 indicating a dispersive object has been detected. Additionally, in some embodiments, a controller 180 may be employed to coordinate the operation of the irradiating multi-frequency source 110, signal receiver 120, signal processor 130, the dispersion analyzer 140, and the output device, 160.

The signal receiver 120 may be configured to receive reradiated signal(s) 114. Reradiated signal(s) 114 may result from an interaction of irradiating electromagnetic signal(s) 115 with a cavity 112 and non-dispersive clutter 113. An irradiating electromagnetic signal is one which is transmitted from an antenna and directly or indirectly (through reflections or multipath) impinges on a cavity. The effect of this interaction may cause reradiated signal(s) 114 at different frequencies to be at different amplitudes and different phases. The effect of this interaction may cause the measured travel time or apparent range between the radar and the object to differ with radio frequency.

According to some embodiments, the irradiating signal(s) 115 may include multiple frequency components. In some embodiments, the irradiating signal(s) 115 may simultaneously include a multitude of frequency components. The multitude of frequency components may be above a cavity dependent cutoff frequency. At least some of the frequency components may be temporal in that they may be irradiated at different times. Alternatively, at least some of the frequency components may be combined. Irradiating signal(s) 115 may be generated by embodiment 100 or by other, non-cooperating, irradiating sources.

Irradiating signal(s) 115 may include electromagnetic signal(s), propagating fields, or the like. In some embodiments, the irradiating signal(s) 115 may include a randomized spectral component. In other words, the irradiating signal 115 may not need to include a predetermined waveform. In yet another embodiment, the irradiating signal 115 may include a spread spectrum irradiating signal. In general, the principle of discriminating between dispersive and non-dispersive signals applies to a wide variety of transmitted radar waveforms, dwell durations, wave form bandwidths, etc.

The irradiating signal(s) 115 may be generated by at least one irradiating multi-frequency source 110. Irradiating signal(s) may be generated using non co-located radiators. These non co-located radiators may be located spatially distinct from the signal receiver 120. The irradiating signal(s) 115 may be generated by non-cooperating multi-frequency sources such as commercial broadcast signals, radars, or other serendipitous or non-cooperating sources of radiating fields.

The reradiated signal 114 may be received by antenna(s) (not shown) and then directed to frequency selective signal receiver 120 as received reflected received (Rx) signal 125. In some embodiments, the signal receiver 120 may be tunable to at least two frequencies. The signal receiver 120 may direct the reradiated signal 114 as received signal 125 to signal processor 130.

According to some embodiments of the present invention, the signal processor 130 may be configured to compute the elapsed time from the transmission of one or more irradiating frequency component to the reception of one or more reradiated frequency components. The elapsed time may be variously referred to here as transit time, round-trip time, phase delay, range, range delay, or the like. The multiplicity of elapsed times may then be used to compute one or more spectral dispersion statistic(s) 135 of the received reflected signal 125. Optionally, the signal processor 130 may compare the relative values of the received reradiated signals 125 from more than one reradiated electromagnetic signal in order to provide more accurate cavity axis orientation statistic(s) 135.

The dispersion analyzer 130 may be as simple as computing the elapsed times in defined frequency bands and determining the ranges where dispersive and non-dispersive objects lie or it may compute averages of elapsed time over a multiplicity of irradiations. It may also take into account non-uniform effective radiated power (ERP) and propagation losses at different frequencies of the irradiating signal(s) 115.

The dispersion analyzer 130 may also include methods for estimating the type of statistical distribution and the sufficient statistics associated with it. For example, if the distribution is Gaussian, then the mean and variance would provide sufficient statistics. There are similar requirements for sufficient statistics for other probability distribution types.

The dispersion analyzer 130 may determine a spectral dispersion statistic which characterizes whether the dispersion characteristics are random or deterministic and fit either a linear or particular non-linear deterministic relation which would be indicative of particular types of dispersive objects. That is, we take the general view of a statistic in that it is " . . . an estimate of a parameter obtained from a sample." [Mathematics Dictionary, James & James, February 1966].

The output of the dispersion analyzer 130 is a dispersive object discrimination value 150 which is compared in an output device 160 with a threshold value 157 generated by a threshold generator 155. The threshold generator 155 may be as simple as a fixed threshold or produce a dynamic threshold value 157 as a result of intermittent or continued analysis of the dispersive object discrimination values 150 or spectral dispersion statistics 135, or the received signal itself 125 (connection not shown).

Example FIG. 2 is a block diagram of an embodiment of an apparatus 200, wherein the signal processor 130 may be configured to compute the elapsed time from the transmission of one or more irradiating frequency component to the reception of one or more reradiated frequency components. The multiplicity of elapsed times may then be used to compute one or more spectral dispersion statistic(s) 135 of the received reflected signal 125. Clutter dispersion analyzer 240 discriminates between dispersive received signals and non-dispersive received signals rejecting non-dispersive signals and passing dispersive signals to produce dispersive object signal 250. Signal integration device 260 receives the dispersive object signal 250 and through analytical means or empirical means combines dispersive object signals in order to improve the signal-to-clutter ratio, thereby producing dispersive object signal 265. The dispersive object is then passed on to other object recognition or discrimination processes such as the cavity detector of U.S. Pat. No. 8,599,061 for improved cavity probability of detection or U.S. Pat. No. 8,939,367 for improved cavity axis orientation measurement accuracy.

The terms wavelength and frequency are used interchangeably herein as it is well known that the velocity of a signal in a propagating medium is equal to the frequency of the signal multiplied by the wavelength of the signal in that medium.

Figure 3:
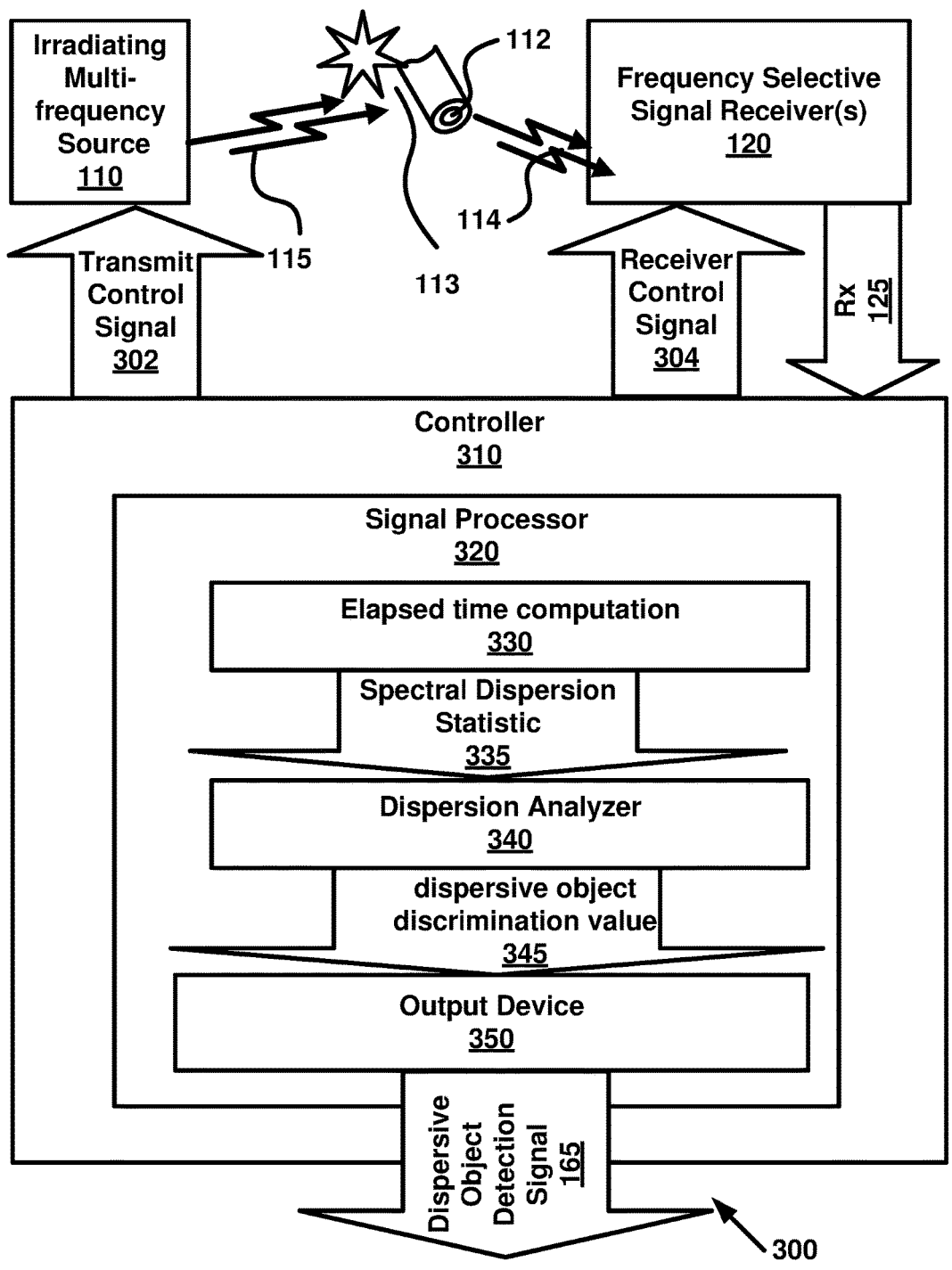
FIG. 3 is a block diagram of an example of a dispersive object or dispersive target detection device configured to use a controller as per an aspect of an embodiment of the present invention.

FIG. 3 is a block diagram of an apparatus 300 configured to detect a dispersive object and to use a controller 310 as per an aspect of an embodiment of the present invention. This embodiment shows the use of a controller 310. Controller 310 may be a special purpose hardware device configured to detect a cavity such as a field programmable gate array (FPGA) or application specific integrated circuit (ASIC). As shown in FIG. 3, controller 310 may control transmit control signal 302 and receiver control signal 304. Transmit control signal 302 controls a radiating multi-frequency source 110. Example controls may direct a radiating multi-frequency source 110 when to radiate, when not to radiate, what frequencies to radiate at, what powers to radiate, or the like. Like previous examples, irradiating signal 115 may interact with cavity 112 and clutter 113.

The result of this interaction with cavity 112 and clutter 113 may result in reradiated signal 114. Frequency selective signal receiver 120 may receive this reradiated signal 114. Receiver control signal 304 may control frequency selective signal receiver 120. Example controls may include received times, received frequencies, filtering, or the like. The output of the frequency selective signal receiver 120 may be forwarded to controller 310 for further processing. Controller 310 may use hardware, software or a combination thereof to process received signal 125.

Signal processor 320 may include a series of modules including: elapsed time computation module 330, dispersion analyzer 340, and output device 350. Elapsed time computation module 330 generates one or more spectral dispersion statistic(s) 335 from the received signal 125 as described earlier. Dispersion analyzer module 340 analyzes spectral dispersion statistic 335 to determine dispersive object discrimination value 345 that may be useful in determining whether a dispersive object is present in the received signal.

Figure 4:
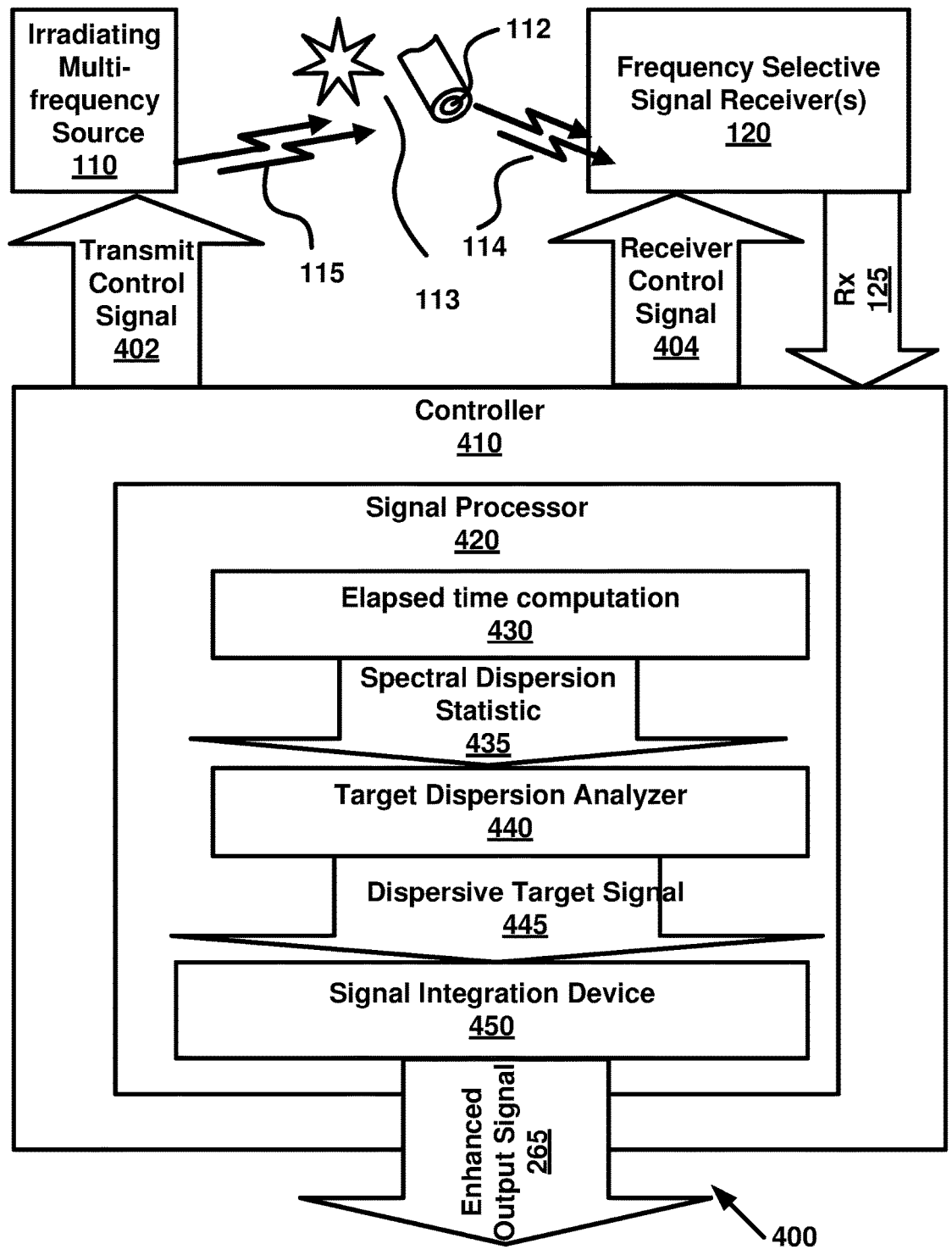
FIG. 4 is a block diagram of an example signal-to-clutter ratio enhancement device configured to use a controller as per an aspect of an embodiment of the present invention.

FIG. 4 is a block diagram of an apparatus 400 configured to enhance a received signal and to use a controller as per an aspect of an embodiment of the present invention. This embodiment shows the use of a controller 410. Controller 410 may be a special purpose hardware device configured to detect a cavity such as a field programmable gate array (FPGA) or application specific integrated circuit (ASIC). As shown in FIG. 4, controller 410 may control transmit control signal 402 and receiver control signal 404. Transmit control signal 402 controls a radiating multi-frequency source 110. Example controls may direct a radiating multi-frequency source 110 when to radiate, when not to radiate, what frequencies to radiate at, what powers to radiate, or the like. Like previous examples, irradiating signal 115 may interact with cavity 112.

The result of this interaction with cavity 112 and clutter 113 may result in reradiated signal 114. Frequency selective signal receiver 120 may receive this reradiated signal 114. Receiver control signal 404 may control frequency selective signal receiver 120. Example controls may include received times, received frequencies, filtering, or the like. The output of the frequency selective signal receiver 120 may be forwarded to controller 410 for further processing. Controller 410 may use hardware, software or a combination thereof to process received signal 125.

Signal processor 420 may include a series of modules including: elapsed time computation module 430, target dispersion analyzer module 440, and signal integration module 450. Elapsed time computation module 430 generates one or more spectral dispersion statistic(s) 435 from the received signal 125 as described earlier. Target dispersion analyzer module 440 analyzes spectral dispersion statistic 435 to produce a dispersive object signal 445. Dispersive object signal is then processed by the signal integration device 450 to produce an enhanced output signal 265 which has an improved signal-to-clutter ratio. The enhanced SCR output signal 265 is then passed to a not shown signal processor for further discrimination of targets from clutter and application of other target detection methodologies such as cavity induced modulation.

Figure 5:
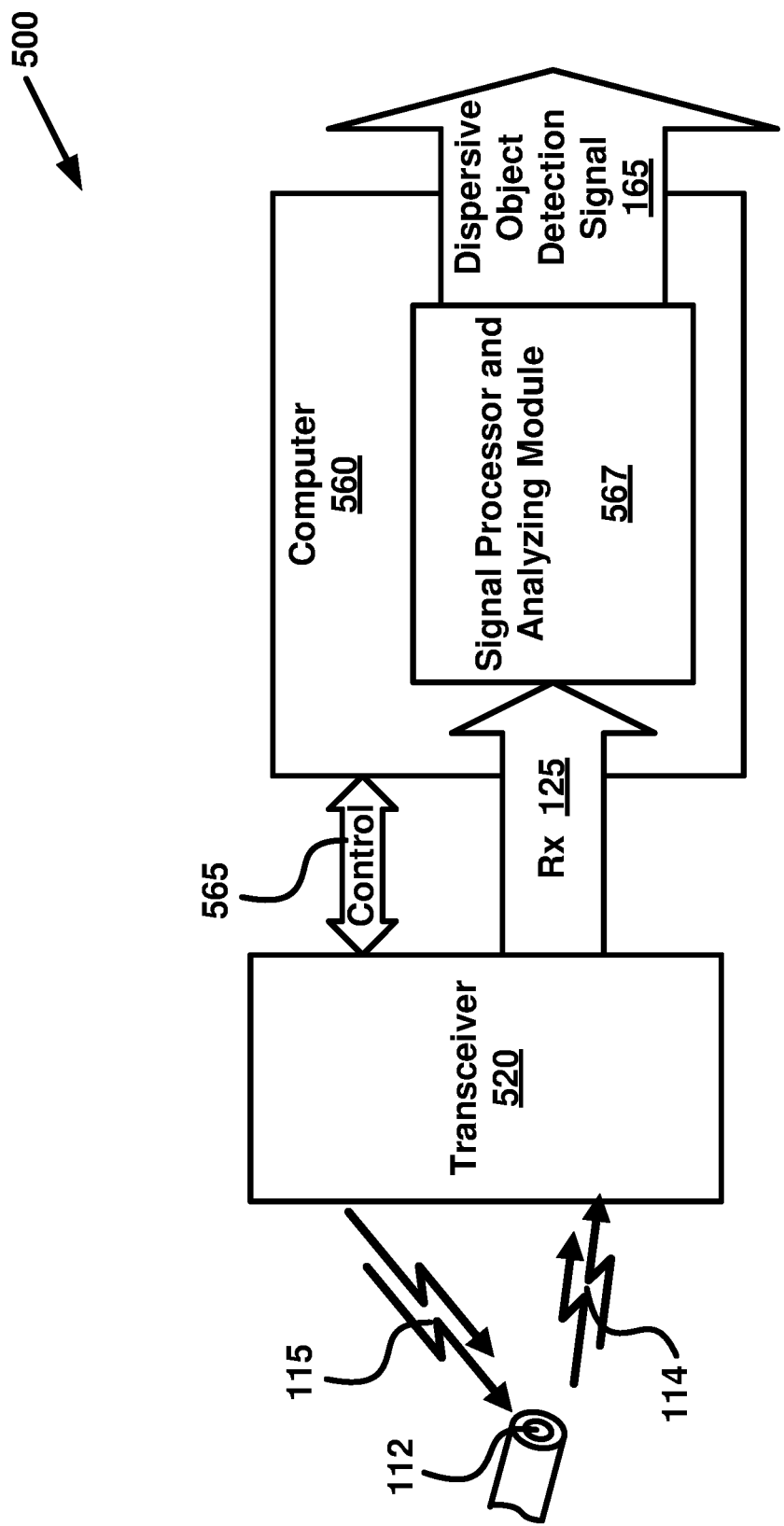
FIG. 5 is a block diagram of a dispersive object or target detection device configured to use a computer as per an aspect of an embodiment of the present invention.

FIG. 5 is a block diagram of an apparatus 500 configured to detect a dispersive object, generally called a target, or a target of interest, which is further configured to use a computer as per an aspect of an embodiment of the present invention. Some embodiments of the present invention may utilize a computer 560 to perform the signal processing required to compute the elapsed time from transmission to reception or, equivalently, the phase shift of the various radiated frequencies. The elapsed times for each different irradiating frequency will be analyzed to determine the amount of differential time, range, or phase shift among the several frequencies. Small shifts (time, range, or phase) is indicative of a non-dispersive object. Large shifts are indicative of a dispersive object being detected from received signal 125. Computer 560 may be a general purpose computer configured to be able to receive signal 125 and control a transceiver 520 using control signal 565. The received signal 125 may be received using a standard computer port such as a USB port, a serial port, a parallel port, wireless communications, or the like. Similarly, control signals 565 may also be transmitted and/or received using a standard computer port. Computer 560 may also be configured to use specialized hardware to perform these interface functions. Transceiver 520 may be a monostatic, bistatic, or multistatic radar device. For example, transceiver 520 may be any type of transceiver capable of generating an irradiation signal 115 and receiving a received returned signal 125.

Signal processing and analyzing module 567 may be a hardware module, a software module and/or a combination thereof located either locally or remotely. One embodiment may include running a software module developed using a mathematical, scientific or engineering computation program such as MATLAB® or the like. In other embodiments, the software module may actually be an operational version of the mathematical simulation program. Yet other embodiments may utilize a combination of a mathematical simulation program in combination with hardware acceleration modules.

Figure 6:
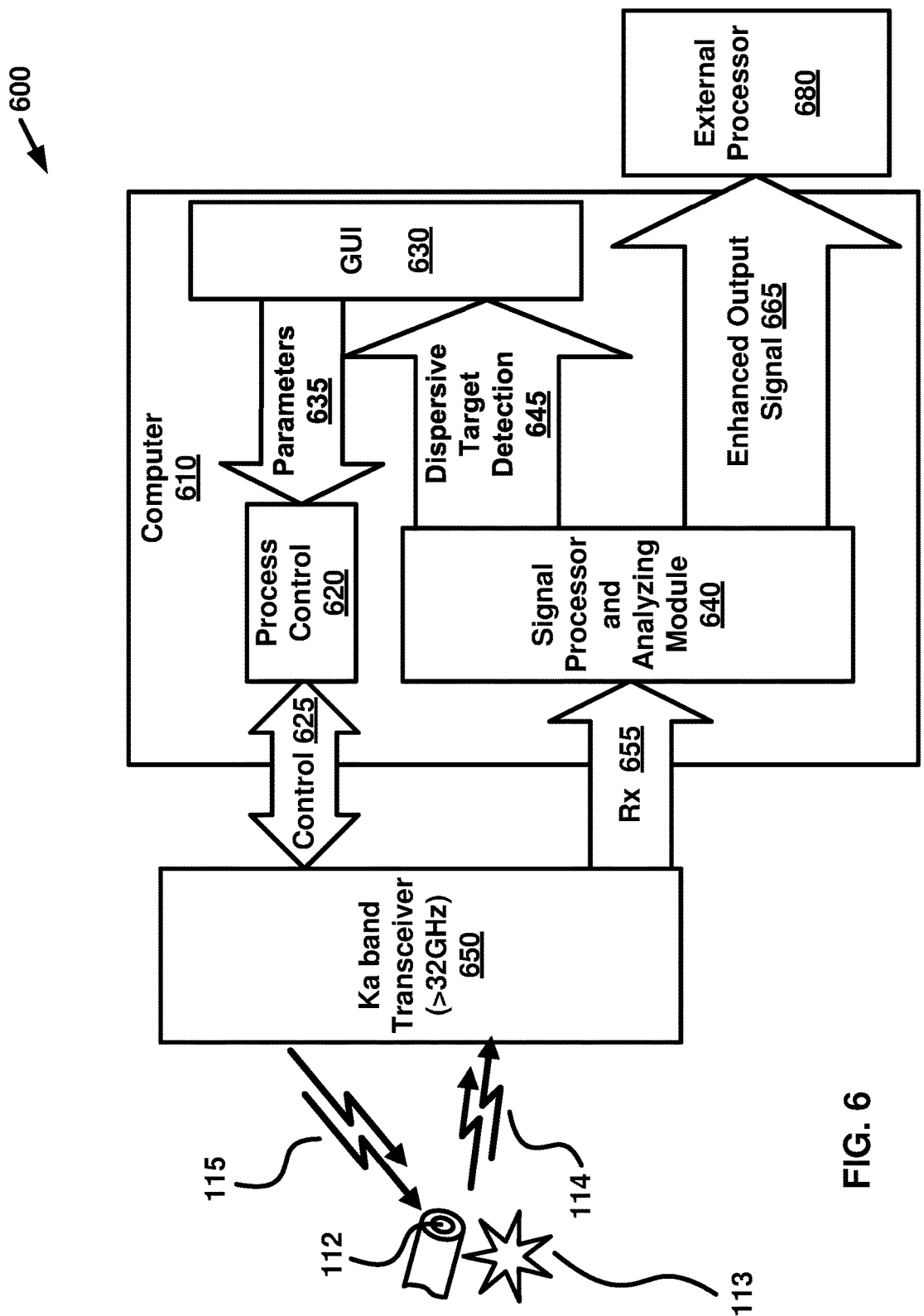
FIG. 6 is a block diagram of an example of a dispersive object or target detection device and simultaneous SCR enhancement device configured to use a computer as per an aspect of an embodiment of the present invention.

FIG. 6 is a block diagram of an apparatus 600 configured to detect a dispersive object or enhance the signal-to-clutter ratio between non-dispersive clutter and dispersive object or targets of interest. It is further configured to use a computer 610 as per an aspect of an embodiment of the present invention. As illustrated, computer 610 interfaces with a $K_a$ band transceiver 650 using unidirectional or multi-directional control signals 625 through process control 620. Received signal 655 is received from transceiver 650 by signal processor and analyzing module 640. Computer 610 provides hardware to transmit and receive the signals 625 and 655. Received signal 655 may be digital and/or analog. In the case where signal 655 is analog, computer 610 may need specialized receive hardware. A graphical user interface (GUI) 630 may run on computer 610 as an interface to a user. GUI 630 may allow the user to specify parameters 635 either directly or indirectly. Indirect specification of parameters 635 may be through the manipulation of a graphical representation (or the like) that has meaning to a user and is capable of being converted into an explicit parameter. These parameters 635 may be interpreted by process control 620 to control transceiver 650. Signal processor and analyzing module 640 may process received signal 655 as described earlier to detect a dispersive target 645 or enhance the signal-to-clutter ratio between non-dispersive clutter and dispersive object or targets of interest 665. Enhanced output signal 665 is then sent to external processor 680 for further detection processing. This dispersive target detection 645 may be presented to user through GUI 630 either directly or indirectly. The GUI may also contain audio or other perceivable components.

As shown, transceiver 650 operates in the $K_a$ frequency band. This band may be useful because of its wavelength and the availability of low-cost components used in commercial radar devices such as police radar guns. However, one skilled in the art will recognize that other transceivers utilizing other frequency bands may be used as long as they exhibit signal characteristics described herein such as being above the waveguide cutoff frequency, have sufficient bandwidth, and are of adequate power.

A cavity is a hollow place or a void or empty space within a solid body. Furthermore, a cavity as used in this disclosure may mean volumes of a material with one physical property contained in whole or in part in an object comprised of a material with physical properties sensibly different from the included volume. Furthermore, if the surface of the body is electrically conductive, then cavities as used in this disclosure may mean indentations in the surface. In some embodiments of the invention, the apparatus may be configured to locate the aimpoint of a sniper rifle. In these types of embodiments, the cavity may be a firearm bore.

FIG. 7A shows the temporal response of a radar illuminating a non-dispersive object with pulses of different frequencies. The non-dispersive nature of the object causes all frequencies to show the target at the same apparent range. Note that the pulses here represent the envelope of a pulse amplitude modulated carrier with the modulated carrier RF frequency not shown.

FIG. 7B shows the temporal response of a radar illuminating a dispersive object with pulses of different frequencies. The dispersive nature of the object causes all frequencies to show the target as being at different apparent ranges. In this example the apparent range is continually increasing over the n pulses at decreasing frequencies. As the frequencies approach the waveguide cutoff frequency of the cavity, the phase delay increases thereby making it appear as if the object is further away.

Various embodiments may use different signal receivers that are compatible with the signal processing methodology used. For example, the signal receiver may be a frequency selective signal receiver configured to be used in temporally determining frequency specific signal statistics. According to some embodiments, the frequency selective signal receiver may be configured to sweep continuously or discretely step over a prescribed bandwidth and receive wavelengths which have illuminated and been reradiated by a cavity. A frequency selective signal receiver is a receiver that can distinguish between a signal received at different frequencies. As a second example, the signal receiver may be a wide-band signal receiver configured to be used in simultaneously determining signal statistics.

Another embodiment of the irradiating signal is to utilize an irradiating signal which contains multiple frequencies in a single transmitted waveform such as a chirp signal. The necessary power spectral density (PSD) can be derived from the reception and extraction of individual frequency components from the chirp signal by methods well known in the art. Additionally, an irradiating signal may include random, pseudo-random, or deterministic frequency components transmitted in a random, pseudo-random, or deterministic order.

Usable wavelengths for irradiating the cavity may be at least those wavelengths which are above the waveguide cutoff frequency, the calculation of which may depend on the electromagnetic modes in the cavity and whether the cavity is circular or rectangular in cross section or simply symmetric in shape, as well as the polarization of the irradiating and received signals (e.g., HH, HV, VV, VH, RH circular, LH circular, or combinations thereof). The sweep bandwidth of this frequency selective signal receiver may need to be wide enough to allow at least one complete cycle of amplitude modulation to insure that a local maxima can be detected.

The output of the receiver may be transferred to a signal analyzer which computes statistics of the reradiated signal. A statistic is, in its most general form, a numerical computation on a set of numbers.

In an alternative embodiment, material properties of the cavity itself may change the characteristics of the reradiated energy by affecting the waveguide propagation velocity. Such properties include the internal surface of the cavity and whether it is made of electrically conductive, partially-conductive, or non-conductive material. In combination with or in addition to the material comprising the internal surface of the cavity, the walls of the material may be made of a material which is dielectrically distinct from the material in the cavity.

Alternative embodiments may be configured to respond to cavities of different geometries. These geometries can include symmetrical cross sections. Symmetrical cross sections can be either circularly symmetric or simply symmetric about one or more axes.

In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e., hardware with a biological element) or a combination thereof, all of which are behaviorally equivalent. For example, modules may be implemented as a software routine written in a computer programming language (such as C, C++, Fortran, Java, Basic, MATLAB®, or the like) or a modeling/simulation program such as Simulink®, Stateflow®, GNU Octave, or LabVIEW® MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASIC), field programmable gate arrays (FPGA), and complex programmable logic devices (CPLD). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

Figure 8:
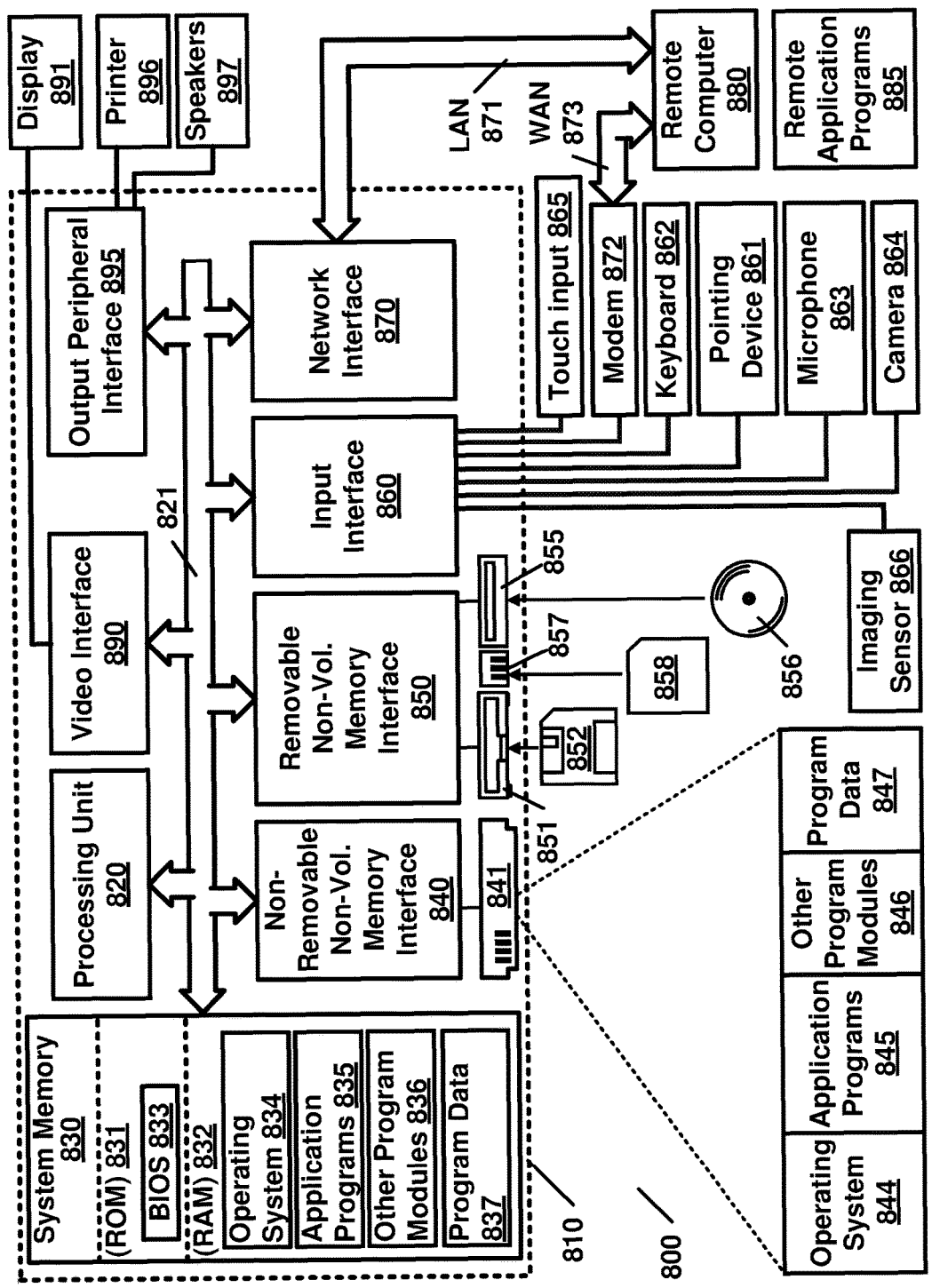
FIG. 8 is a block diagram illustrating a computing environment in which aspects of embodiments of the present invention may be practiced.

FIG. 8 illustrates an example of a suitable computing system environment 800 on which embodiments may be implemented. The computing system environment 800 is only one example of a suitable computing environment and is not intended to suggest any limitation as to the scope of use or functionality of the claimed subject matter. Neither should the computing environment 800 be interpreted as having any dependency or requirement relating to any one or combination of components illustrated in the exemplary operating environment 800.

Embodiments are operational with numerous other general purpose or special purpose computing system environments or configurations. Examples of well-known computing systems, environments, and/or configurations that may be suitable for use with various embodiments include, but are not limited to, embedded computing systems, personal computers, server computers, hand-held or laptop devices, multiprocessor systems, microprocessor-based systems, set-top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 8, an example system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 830 includes computer storage media in the form of volatile and/or nonvolatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, program data 847, and other program modules 846. Additionally, for example, non-volatile memory may include signal processing modules 380, threshold excedent determination processing module 390, combinations thereof, and/or the like.

A user may enter commands and information into the computer 810 through input devices such as a keyboard 862, a microphone 863, and a pointing device 861, such as a mouse, trackball or touch pad. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device may also connected to the system bus 821 via an interface, such as a video interface 890. Other devices, such as, for example, speakers 897 and printer 896 may be connected to the system via peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments. For example, the irradiating signal can be any type of propagating wave and could be electromagnetic. The cavity can be open or closed and, depending on the type of irradiating signal, can be made of electrically conductive or non-conductive material or coatings.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. An apparatus comprising:
   a. a frequency selective signal receiver configured to receive at least one reradiated electromagnetic signal resulting from an interaction of an irradiating electromagnetic signal with an object, said irradiating electromagnetic signal including at least one first irradiating frequency component and at least one second irradiating frequency component, and said reradiated electromagnetic signal including at least one first reradiated frequency component and at least one second reradiated frequency component;
   b. a signal processor configured to compute:
      i. at least one first elapsed time from the transmission of said at least one first irradiating frequency component to the reception of said at least one first reradiated frequency component, and,
      ii. at least one second elapsed time from the transmission of said at least one second irradiating frequency component to the reception of said at least one second reradiated frequency component, and,
      iii. at least one spectral dispersion statistic utilizing said at least one first elapsed time and said at least one second elapsed time;
   c. a dispersion analyzer configured to utilize said at least one spectral dispersion statistic to produce a dispersive object discrimination value;
   d. an output device configured to produce a dispersive object detection signal when said dispersive object discrimination value exceeds a threshold.

2. An apparatus according to claim 1, wherein said dispersion analyzer employs a look-up table.

3. An apparatus according to claim 1, wherein said dispersion analyzer employs an analytic expression.

4. An apparatus according to claim 1, wherein said at least one irradiating signal includes a randomized spectral component.

5. An apparatus according to claim 1, wherein said at least one irradiating signal includes a spread spectrum irradiating signal.

6. An apparatus according to claim 1, wherein said at least one irradiating signal is generated using at least two non co-located radiators.

7. An apparatus according to claim 1, wherein the at least one irradiating signal originates from a location spatially distinct from the signal receiver.

8. An apparatus according to claim 1, wherein at least one reradiated signal is above a dispersive object dependent cutoff frequency.

9. An apparatus according to claim 1, wherein said dispersive object is a weapon bore.

10. An apparatus according to claim 1, wherein the signal receiver is tunable to at least three frequencies.

11. An apparatus comprising:
   a. a frequency selective signal receiver configured to receive at least one reradiated electromagnetic signal resulting from an interaction of an irradiating electromagnetic signal with an object, said irradiating electromagnetic signal including at least one first irradiating frequency component and at least one second irradiating frequency component, and said reradiated electromagnetic signal including at least one first reradiated frequency component and at least one second reradiated frequency component;
   b. a signal processor configured to compute:
      i. at least one first elapsed time from the transmission of said at least one first irradiating frequency component to the reception of said at least one first reradiated frequency component, and,
      ii. at least one second elapsed time from the transmission of said at least one second irradiating frequency component to the reception of said at least one second reradiated frequency component, and, iii. at least one spectral dispersion statistic utilizing said at least one first elapsed time and said at least one second elapsed time;
c. a target dispersion analyzer configured to utilize said at least one spectral dispersion statistic to discriminate between at least one dispersive reradiated electromagnetic signal and at least one non-dispersive reradiated electromagnetic signal whereby at least one dispersive object signal is output;
d. a signal integration device configured to combine said at least one dispersive object signal thereby producing a signal-to-clutter ratio enhanced output signal.

12. A method comprising:
a. receiving at least one reradiated electromagnetic signal resulting from an interaction of an irradiating electromagnetic signal with an object, said irradiating electromagnetic signal including at least one first irradiating frequency component and at least one second irradiating frequency component, and said reradiated electromagnetic signal including at least one first reradiated frequency component and at least one second reradiated frequency component;
b. processing said at least one reradiated electromagnetic signal by computing:
  i. at least one first elapsed time from the transmission of said at least one first irradiating frequency component to the reception of said at least one first reradiated frequency component, and,
  ii. at least one second elapsed time from the transmission of said at least one second irradiating frequency component to the reception of said at least one second reradiated frequency component, and,
  iii. at least one spectral dispersion statistic utilizing said at least one first elapsed time and said at least one second elapsed time;
c. analyzing said at least one spectral dispersion statistic to produce a dispersive object discrimination value;
d. outputting a dispersive object detection signal when said dispersive object discrimination value exceeds a threshold.

13. The method of claim 12, wherein the predetermined threshold value is dynamically changed depending on the environmental and weather conditions.

14. The method of claim 12, wherein the predetermined threshold value is dynamically changed depending on previously received signals.

15. The method of claim 12, wherein the dispersive scatterers and non-dispersive scatterers are determined by using a maximum likelihood test for dispersion/non-dispersion in at least two dimensions.

16. The method of claim 12, wherein a non-dispersive scatterer is considered as a clutter or interference and a dispersive scatterer is considered as the target.

17. The method of claim 12, further comprising deleting the non-dispersive scatterers from the radar return signal to obtain a cleansed radar return signal.

18. The method of claim 12, wherein said spectral dispersion statistic is computed as the mean and variance of a distribution.

19. The method of claim 12, wherein said spectral dispersion statistic is computed by the temporal spread of adjacent individual scatterers.

20. The method of claim 12, wherein said at least one irradiating signal includes a randomized spectral component.

* * * * *